United States Patent
Xia et al.

(10) Patent No.: US 9,585,093 B2
(45) Date of Patent: Feb. 28, 2017

(54) ENERGY-SAVING CONTROL METHOD AND DEVICE FOR CELL IN HETEROGENEOUS SYSTEM

(71) Applicant: HUAWEI TECHNOLOGIES CO., LTD., Shenzhen (CN)

(72) Inventors: Haitao Xia, Beijing (CN); Xuanyu Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 14/078,925

(22) Filed: Nov. 13, 2013

(65) Prior Publication Data
US 2014/0066051 A1 Mar. 6, 2014

Related U.S. Application Data

(63) Continuation of application No. PCT/CN2012/075173, filed on May 8, 2012.

(30) Foreign Application Priority Data

May 13, 2011 (CN) .......................... 2011 1 0123604

(51) Int. Cl.
*H04W 4/00* (2009.01)
*H04W 52/02* (2009.01)

(52) U.S. Cl.
CPC ......... *H04W 52/0206* (2013.01); *Y02B 60/50* (2013.01)

(58) Field of Classification Search
None
See application file for complete search history.

(56) References Cited

U.S. PATENT DOCUMENTS

2010/0279704 A1* 11/2010 Vachhani ............... H04W 48/06
455/453
2010/0316034 A1 12/2010 Burbidge et al.
(Continued)

FOREIGN PATENT DOCUMENTS

CN 101420790 4/2009
CN 101965038 2/2011
(Continued)

OTHER PUBLICATIONS

Extended European Search Report, dated Jun. 23, 2014, in corresponding European Application No. 12785002.2 (11 pp.).
(Continued)

*Primary Examiner* — Shantell L Heiber
(74) *Attorney, Agent, or Firm* — Staas & Halsey LLP

(57) ABSTRACT

The present invention provides an energy-saving control method for a cell in a heterogeneous system, including: receiving, by an access control device of a serving cell, a service request of a multi-mode user equipment UE; and when a radio resource of the serving cell cannot satisfy the service request of the multi-mode UE, if the access control device of the serving cell determines that a heterogeneous-system neighboring cell of the serving cell is in an energy-saving state, sending, by the access control device of the serving cell, an exit energy-saving state request message to an access control device of the heterogeneous-system neighboring cell, where the exit energy-saving state request message is used to request the heterogeneous-system neighboring cell to exit the energy-saving state. The technical solution implements energy-saving control for a cell in a heterogeneous system.

8 Claims, 2 Drawing Sheets

(56) References Cited

U.S. PATENT DOCUMENTS

| | | | |
|---|---|---|---|
| 2011/0044284 A1* | 2/2011 | Voltolina | H04W 24/02 370/331 |
| 2011/0103301 A1 | 5/2011 | Mueck et al. | |
| 2011/0170466 A1* | 7/2011 | Kwun | H04W 52/0235 370/311 |
| 2012/0113882 A1 | 5/2012 | Zhao et al. | |
| 2012/0236707 A1* | 9/2012 | Larsson | H04W 76/028 370/217 |

FOREIGN PATENT DOCUMENTS

| | | |
|---|---|---|
| CN | 101990263 | 3/2011 |
| JP | 2013-502820 | 1/2013 |
| WO | WO2009084864 | 7/2009 |
| WO | WO2010/146467 | 12/2010 |

OTHER PUBLICATIONS

Chinese Office Action dated May 27, 2014 in corresponding Chinese Patent Application No. 201110123604.1.
International Search Report mailed Aug. 9, 2012 in corresponding International Application No. PCT/CN2012/075173.
Japanese Office Action issued on Sep. 24, 2014 in corresponding Japanese Patent Application No. 2014-509593.
Qualcomm Incorporated, "RIM-based Signalling in Inter-RAT Network Energy Saving", 3GPP TSG RAN WG3 Meeting #69bis, Xi'an, China, Oct. 11-15, 2010, 8 Pages.
Qualcomm Incorporated, "Clarification and Comparison of Cell Wake-up Solutions", 3GPP TSG-RAN WG3 #70bis, Dublin, Ireland, Jan. 17-21, 2011, pp. 9 Pages.
International Search Report and Written Opinion on Searching Authority issued on May 8, 2012 in corresponding International Application No. PCT/CN2011/075173.

* cited by examiner

ENERGY-SAVING CONTROL METHOD AND DEVICE FOR CELL IN HETEROGENEOUS SYSTEM

CROSS-REFERENCE TO RELATED APPLICATIONS

This application is a continuation of International Application No. PCT/CN2012/075173, filed on May 8, 2012, which claims priority to Chinese Patent Application No. 201110123604.1, filed on May 13, 2011, both of which are hereby incorporated by reference in their entireties.

TECHNICAL FIELD

The present invention relates to the communications field, and in particular, to an energy-saving control method and device for a cell in a heterogeneous system.

BACKGROUND

A self-organizing network (SON, Self-Organizing Network) is a specific standardization task of the Third Generation Partnership Project (3GPP, the $3^{rd}$ Generation Partnership Project) international standard organization. The core idea thereof is to reduce, by using an automation process in network planning, deployment, optimization, and maintenance stages, conventional manual operations, thereby reducing maintenance costs of a network operator. Energy saving (ES, Energy Saving) or an energy-saving control method is a very important subject in the SON standardization task, which is especially true for a cell in a heterogeneous system or an inter-radio-access technology (Inter-RAT, Inter Radio Access Technology) cell.

A heterogeneous-system cell refers to a cell where different radio access technologies (that is, different radio standards) for example, a second generation mobile communications technology (2G, that is, Global System for Mobile Communications (Global System of Mobile communication, GSM)), a third generation mobile communications technology (3G, that is, Universal Mobile Telecommunications System (Universal Mobile Telecommunications System, UMTS)), and a fourth generation mobile communications technology (4G, that is, a Long-Term Evolution (Long Term Evolution) system, also referred to as an LTE system), are superimposed and cover the same geographic region. Generally, a cell using a 4G standard (also referred to as an Evolved Universal Terrestrial Radio Access Network (E-UTRAN, Evolved Universal Terrestrial Radio Access Network) cell, hereinafter referred to as an E-UTRAN cell) provides capacity extensibility for some hot spot (hot spot) areas within the region, thereby ensuring high-speed data services or multimedia services in the hot spot areas; a cell using a 3G standard (also referred to as an Universal Terrestrial Radio Access Network (UTRAN, Universal Terrestrial Radio Access Network) cell, hereinafter referred to as an UTRAN cell) or a cell using a 2G standard provides basic coverage for the entire geographic region and ensures basic services within the region, such as the provision of voice services and low- and medium-speed data services.

In the prior art, an energy-saving control method for a cell is limited to an intra-LTE (Intra-LTE) cell. That is, a cell for which energy saving can be switched on/off is an E-UTRAN cell, and in an energy-saving process, basic coverage and support is also provided by the E-UTRAN cell. The energy-saving control method is merely based on monitoring of a traffic load (traffic load) threshold of an E-UTRAN cell. However, in a scenario of energy-saving for a cell in a heterogeneous system, the method based on monitoring of a traffic load threshold of a cell in the prior art has its obvious limitation. The method cannot smoothly cater for the problem of deteriorated quality of service due to a difference between services of cells in heterogeneous systems when a multi-mode user equipment (UE, User Equipment) moves between the cells in the heterogeneous systems. This is an urgent problem to be solved for energy-saving control between cells in heterogeneous systems.

SUMMARY

In one aspect, the present invention provides an energy-saving control method for a cell in a heterogeneous system, including: receiving, by an access control device of a serving cell, a service request of a multi-mode user equipment UE; and when a radio resource of the serving cell cannot satisfy the service request of the multi-mode UE, if the access control device of the serving cell determines that a heterogeneous-system neighboring cell of the serving cell is in an energy-saving state, sending, by the access control device of the serving cell, an exit energy-saving state request message to an access control device of the heterogeneous-system neighboring cell, where the exit energy-saving state request message is used to request the heterogeneous-system neighboring cell to exit the energy-saving state.

In another aspect, the present invention further provides an energy-saving control method for a cell in a heterogeneous system, including: determining, by an evolved base station in a heterogeneous system, whether to set a cell controlled by the evolved base station to enter an energy-saving state according to whether there is a radio resource control RRC connection or an active multi-mode user equipment UE in the cell or according to a zero-load period of the cell.

In another aspect, the present invention further provides an access control device, including: a first receiving unit, configured to receive a service request of a multi-mode user equipment UE; and a first sending unit, configured to send, when a radio resource of a serving cell cannot satisfy the service request of the multi-mode UE, and after it is determined that a heterogeneous-system neighboring cell of the serving cell is in an energy-saving state, an exit energy-saving state request message to an access control device of the heterogeneous-system neighboring cell, where the exit energy-saving state request message is used to request the heterogeneous-system neighboring cell to exit the energy-saving state.

In another aspect, the present invention further provides an evolved base station, including: a first determining unit, configured to determine whether to set a cell controlled by the evolved base station to enter an energy-saving state according to whether there is a radio resource control RRC connection or an active multi-mode user equipment UE in the cell; or a second determining unit, configured to determine whether to set the cell to enter an energy-saving state according to a zero-load period of the cell.

In the above technical solutions, in one aspect, a solution is used to determine whether to request, according to a service request of a multi-mode UE, a heterogeneous-system neighboring cell in an energy-saving state to exit the energy-saving state, thereby implementing energy-saving control between cells in heterogeneous systems; in another aspect, it is determined, according to whether there is a radio resource control RRC connection or an active multi-mode UE in a cell controlled by the evolved base station or according to a zero-load period of the cell, whether to set the cell to enter the energy-saving state, which also implements energy-saving control between cells in heterogeneous systems.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of skill in the art may still derive other drawings from these accompanying drawings.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All the other embodiments obtained by a person skilled in the art based on the embodiments of the present invention shall fall within the protection scope of the present invention.

Figure 1:
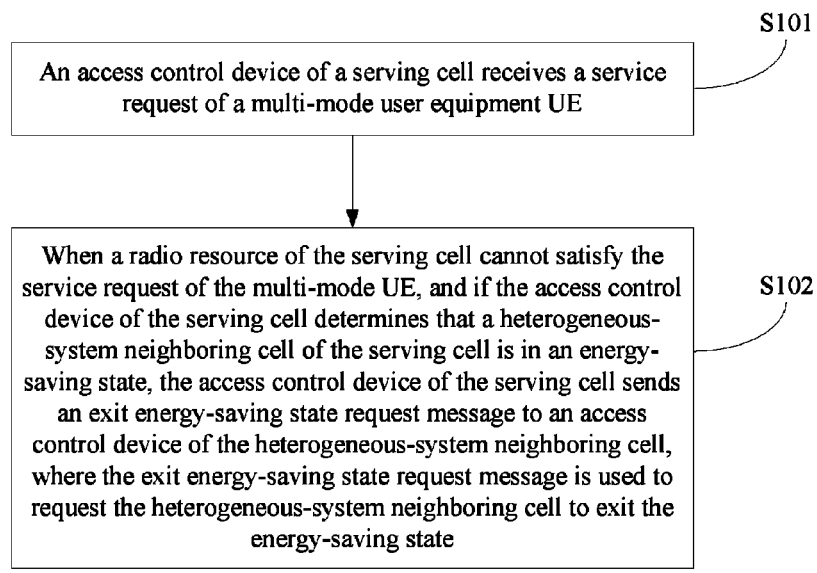
FIG. 1 is a schematic flowchart of an energy-saving control method for a cell in a heterogeneous system according to an embodiment of the present invention.

FIG. 1 is a schematic flowchart of an energy-saving control method for a cell in a heterogeneous system according to an embodiment of the present invention, including the following content.

S101. An access control device of a serving cell receives a service request of a multi-mode UE.

As an optional implementation of the present invention, the service request of the multi-mode UE received by the access control device of the serving cell may be a radio resource control (RRC, Radio Resource Control) connection setup request sent by the multi-mode UE and received by the access control device. For example, the RRC connection setup request may be initiated by the multi-mode UE by sending an "RRC connection request (RRC Connection Request)" message to a base station controller, where the RRC Connection Request message carries service information required for setting up an RRC connection, information about an E-UTRAN support capability of the UE, and the like.

As another implementation of the present invention, the service request of the multi-mode UE received by the access control device of the serving cell may be a radio access bearer (RAB, Radio Access Bearer) assignment request (RAB Assignment Request) sent by a core network (CN, Core Network) device and received by the access control device, where the radio access bearer assignment request includes the service request of the multi-mode UE. Specifically, in a non-access stratum (NAS, Non-Access Stratum) signaling interaction process between the multi-mode UE and the CN, the multi-mode UE notifies, by using a service request information element, the CN device of a service type required by the multi-mode UE; the CN device determines, according to the information element "service type", information such as a maximum bit rate and a guaranteed bit rate required by the service type, and then initiates a radio access bearer (RAB, Radio Access Bearer) assignment process to an RNC. For example, the CN device sends a "radio access bearer assignment request (RAB Assignment Request)" message to a base station controller, where the message carries information elements such as a service type requested by the UE, a maximum bit rate, and a guaranteed bit rate.

S102. When a radio resource of the serving cell cannot satisfy the service request of the multi-mode UE, and if the access control device of the serving cell determines that a heterogeneous-system neighboring cell of the serving cell is in an energy-saving state, the access control device of the serving cell sends an exit energy-saving state request message to an access control device of the heterogeneous-system neighboring cell, where the exit energy-saving state request message is used to request the heterogeneous-system neighboring cell to exit the energy-saving state.

Alternatively, the access control device of the serving cell may also send instruction information to the multi-mode UE, where the instruction information is used to instruct the multi-mode UE to, when the heterogeneous-system neighboring cell exits the energy-saving state, redirect to the heterogeneous-system neighboring cell to request for a service.

If the service request of the multi-mode UE received by the access control device of the serving cell is a radio resource control RRC connection setup request, the instruction information is included in an RRC connection setup reject message sent by the access control device of the serving cell to the multi-mode UE. If the service request of the multi-mode user equipment UE received by the access control device of the serving cell is a radio access bearer assignment request including the service request of the multi-mode UE and sent by a core network device, the instruction information is included in a radio access bearer assignment response message sent by the access control device of the serving cell to the core network device.

In the embodiment of the present invention, the multi-mode UE refers to a UE that can camp on a cell in a heterogeneous system (that is, a different radio access technical standard, such as GSM, UTRAN, or E-UTRAN) to perform communication. The serving cell refers to a serving cell of the multi-mode UE. As an optional embodiment of the present invention, the serving cell may be a UTRAN cell or a GSM cell, and the heterogeneous-system neighboring cell may be an E-UTRAN cell neighboring the serving cell. Correspondingly, the access control device of the serving cell may be a base station controller of a control base station of the GSM cell or the UTRAN cell, such as an RNC or a BSC, and the access control device of the heterogeneous-system neighboring cell may be a control base station eNB of the E-UTRAN cell. The E-UTRAN cell is a cell covered by a fourth generation mobile communications technology 4G (that is, an LTE system) in a heterogeneous system, which may provide a high-speed data service or a multimedia service to the multi-mode UE.

When the service request of the multi-mode UE received by the access control device of the serving cell is the RRC connection setup request or is the radio access bearer assignment request sent by the CN device, as an embodiment of the present invention, the access control device of the serving cell determines, by searching a neighboring cell list of the serving cell, whether a heterogeneous-system neighboring cell (for example, a neighboring E-UTRAN cell) of the serving cell is in a working state or in an energy-saving state. The heterogeneous-system neighboring cell in a working state refers to a heterogeneous-system neighboring cell which provides normal communication service without a failure or being in an energy-saving state.

Specifically, if the access control device of the serving cell searches the neighboring cell list of the serving cell, and the access control device of the serving cell does not find a heterogeneous-system neighboring cell in a working state or a heterogeneous-system neighboring cell in an energy-saving state, the access control device of the serving cell returns a "RRC connection reject (RRC Connection Reject)" message to the multi-mode UE, where the message carries a reject reason, for example, no radio resource to satisfy the service request, and the RRC connection setup process ends; or the access control device of the serving cell returns an "RAB assignment response (RAB Assignment Response)" message to the multi-mode UE, where the message carries a reason for unsuccessfully RAB assignment, for example, "requested maximum bit rate unavailable (Requested Maximum Bit Rate not Available)", and the RAB assignment process ends.

If the access control device of the serving cell searches out a heterogeneous-system neighboring cell (for example, a neighboring E-UTRAN cell) in an energy-saving state by searching the neighboring cell list of the serving cell, the access control device of the serving cell sends an exit energy-saving state request message to an access control device (for example, an eNB) of the heterogeneous-system neighboring cell, where the exit energy-saving state request message is used to request the heterogeneous-system neighboring cell to exit the energy-saving state.

When the heterogeneous-system neighboring cell (such as a neighboring E-UTRAN cell) in an energy-saving state in the heterogeneous system is wakened up by an RRC connection setup process initiated by the multi-mode UE on the serving cell side, that is, when the service request of the multi-mode UE received by the access control device of the serving cell is a radio resource control RRC connection setup request sent by the multi-mode UE, if the access control device of the serving cell finds a heterogeneous-system neighboring cell in a working state by searching the neighboring cell list of the serving cell, the access control device of the serving cell sends an "RRC connection reject (RRC Connection Reject)" message to the multi-mode UE, where the message is used to instruct the multi-mode UE to redirect to the heterogeneous-system neighboring cell in the working state. Otherwise, if the access control device of the serving cell searches out a heterogeneous-system neighboring cell (for example, a neighboring E-UTRAN cell) in an energy-saving state by searching the neighboring cell list of the serving cell, the access control device of the serving cell sends an exit energy-saving state request message to an access control device of the heterogeneous-system neighboring cell.

For example, when the heterogeneous-system neighboring cell is an E-UTRAN cell neighboring the serving cell, the access control device of the serving cell sends to an access control device (for example, an eNB) of the neighboring E-UTRAN cell in the energy-saving state a signaling message which is used to request the neighboring E-UTRAN cell in the energy-saving state to exit the energy-saving state. The process of sending the signaling message by the access control device of the serving cell is a radio access network (RAN, Radio Access Network) information management (RIM, RAN Information Management) process based on a heterogeneous system. In the RIM process, a message transfer mode of "direct information transfer (DIT, Direct Information Transfer)" may be employed to transfer signaling. That is, an RIM message (that is, signaling for requesting the heterogeneous-system neighboring cell in the energy-saving state to exit the energy-saving state) is initiated by the access control device (for example, an RNC) of the serving cell, goes through a core network device (for example, an SGSN (Serving GPRS Support Node, Serving GPRS Support Node) of an UMTS network) of the serving cell, then goes through a core network device (for example, a mobility management entity (MME, Mobility Management Entity) of an LTE network) of the heterogeneous-system neighboring cell, and finally reaches the access control device (for example, an eNB) of the neighboring heterogeneous-system neighboring cell in the energy-saving state. Because the RIM message is not directly transferred to the access control device of the heterogeneous-system neighboring cell, the RIM message (exit energy-saving state request message) carries an identifier of the access control device of the heterogeneous-system neighboring cell in the energy-saving state, an identifier of the heterogeneous-system neighboring cell in the energy-saving state, and a type of an operation to be performed.

While or after the access control device of the serving cell sends the exit energy-saving state request message to the access control device of the heterogeneous-system neighboring cell, the access control device of the serving cell sends an "RRC connection reject (RRC Connection Reject)" message to the multi-mode UE, where the RRC connection setup reject message is used to instruct the multi-mode UE to redirect to the heterogeneous-system neighboring cell that has exited the energy-saving state.

When the heterogeneous-system neighboring cell (for example, a neighboring E-UTRAN cell) in the energy-saving state in the heterogeneous system is wakened up by an RAB assignment process initiated by a CN device on the serving cell side, that is, when the service request of the multi-mode UE received by the access control device of the serving cell is a radio access bearer assignment request (including the service request of the multi-mode UE) sent by the CN device, if the access control device of the serving cell searches out a heterogeneous-system neighboring cell in an energy-saving state by searching the neighboring cell list, the access control device of the serving cell sends an exit energy-saving state request message to an access control device of the heterogeneous-system neighboring cell.

For example, when the heterogeneous-system neighboring cell is an E-UTRAN cell neighboring the serving cell, the access control device of the serving cell sends to an access control device of the neighboring E-UTRAN cell in the energy-saving state a signaling message which is used to request the neighboring E-UTRAN cell in the energy-saving state to exit the energy-saving state. A process of sending the signaling message by the access control device of the serving cell is a process based on RIM. In the RIM process, a DIT message transfer mode is employed to transfer signaling. Because the RIM message is not directly transferred to the access control device of the heterogeneous-system neighboring cell, the RIM message (exit energy-saving state request message) carries an identifier of the access control device of the heterogeneous-system neighboring cell in the energy-saving state, an identifier of the heterogeneous-system neighboring cell in the energy-saving state, and a type of an operation to be performed.

While or after the access control device of the serving cell sends the exit energy-saving state request message to the access control device of the heterogeneous-system neighboring cell, the access control device of the serving cell sends a "radio access bearer assignment response (RAB Assignment Response)" message to the CN device, where the radio access bearer assignment response message is used to instruct the multi-mode UE to redirect to the heterogeneous-system neighboring cell that has exited the energy-saving state.

In another optional embodiment, in order to enable the multi-mode UE to know when to redirect to the heterogeneous-system neighboring cell (for example, a neighboring E-UTRAN cell) that has exited the energy-saving state, in the embodiment of the present invention, the access control device of the heterogeneous-system neighboring cell, upon receiving the RIM message, further returns an exit energy-saving state response message to the access control device of the serving cell, where the exit energy-saving state response message carries time when the heterogeneous-system neighboring cell exits the energy-saving state. The access control device of the serving cell, upon receiving the exit energy-saving state response message carrying the time for the heterogeneous-system neighboring cell to exit the energy-saving state, includes wait time for the multi-mode UE to redirect to the heterogeneous-system neighboring cell that has exited the energy-saving state in the RRC connection setup reject message returned to the multi-mode UE or in the radio access bearer assignment response message returned to the CN device. The wait time is used to instruct the multi-mode UE to, when the wait time is due, redirect to the heterogeneous-system neighboring cell that has exited the energy-saving state, where the wait time may be greater than or equal to the time for the heterogeneous-system neighboring cell to exit the energy-saving state.

In another embodiment provided by the present invention, when the access control device of the serving cell receives the service request of the multi-mode user equipment UE but a cell controlled by the access control device of the serving cell cannot satisfy the service request, the access control device of the serving cell may query a locally stored intention concerning whether the multi-mode UE allows/agrees to use a data service provided by a cell controlled by the access control device of the serving cell with a lower speed within a short period of time. If the multi-mode UE allows/agrees to use the data service with a lower speed within a short period of time, the access control device of the serving cell may carry, in the message returned to the multi-mode UE or to the CN device, a message indicating successful execution, for example, an RRC Connection Response or RAB Assignment Response message that carries a success indicator. Thereby, the multi-mode UE uses the data service with a lower speed in the UTRAN network. After an evolved base station of the neighboring E-UTRAN cell notifies the access control device of the serving cell that the E-UTRAN cell has exited the energy-saving state, the access control device of the serving cell immediately redirects or hands over the multi-mode UE to the heterogeneous-system neighboring cell (for example, an E-UTRAN cell).

The foregoing embodiment of the present invention provides an energy-saving control method for a cell in a heterogeneous system. Further, in a solution of an optional embodiment, when the serving cell is a GSM cell or a UTRAN cell, and the heterogeneous-system neighboring cell is an E-UTRAN cell, compared with the method provided by the prior art which is subject to service degradation, where, when it is detected that the E-UTRAN cell is in a light-load state, remaining active (Active) UEs are relocated to a conventional cell (a UTRAN cell), in the method according to the embodiment of the present invention, the E-UTRAN cell may be requested to be in an energy-saving state when it does not need to provide a high-speed data service to a hot spot area, and the E-UTRAN cell may also be requested to exit the energy-saving state when the multi-mode UE has a new high-speed data service request. Thereby high-speed data services are provided normally, which avoids a risk of user complaints caused by a conventional cell (for example, a UTRAN cell) providing a low- or medium-speed data service to the multi-mode UE for a long period of time, thereby guaranteeing service experience of the multi-mode UE.

The embodiment of the present invention further provides an energy-saving control method for a cell in a heterogeneous system, which mainly includes the following content.

An evolved base station in a heterogeneous system determines whether to set a cell controlled by the evolved base station to enter an energy-saving state according to whether there is a radio resource control RRC connection or an active multi-mode user equipment UE in the cell or according to a zero-load period of the cell.

In the embodiment of the present invention, the evolved base station (e-NodeB, evolved NodeB) in a heterogeneous system may be a control base station of an E-UTRAN cell in the heterogeneous system, where the E-UTRAN cell is a cell covered by a fourth generation mobile communications technology 4G in the heterogeneous system.

Figure 2:
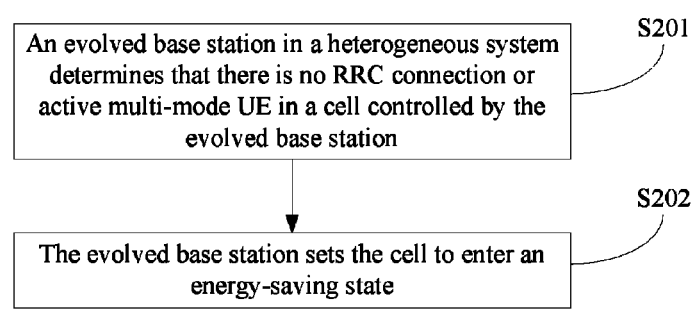
FIG. 2 is a schematic flowchart of an energy-saving control method for a cell in a heterogeneous system according to another embodiment of the present invention.

As shown in FIG. 2, in an embodiment of the present invention, an evolved base station in a heterogeneous system determines whether to set a cell controlled by the evolved base station to enter an energy-saving state according to whether there is an RRC connection or an active multi-mode UE in the cell, which specifically includes the following content.

S201. The evolved base station in the heterogeneous system determines that there is an RRC connection or an active multi-mode UE in the cell controlled by the evolved base station.

S202. The evolved base station sets the cell to enter an energy-saving state.

That there is an RRC connection or an active multi-mode UE in the cell means that a UE maintains a service connection and is active in a service communication. As an optional embodiment, the cell controlled by the evolved base station is an E-UTRAN cell.

In order to determine more accurately whether to set the cell controlled by the evolved base station in the heterogeneous system to the energy-saving state, in another embodiment of the present invention, the evolved base station may obtain a latency set by a network management system (NMS, Network Management System) for the cell controlled by the evolved base station to enter the energy-saving state. For example, an integrated reference point agent IRPAgent of the evolved base station receives a latency sent by an integrated reference point manager IRPManager for the cell controlled by the evolved base station to enter the energy-saving state, and then the IRPAgent transfers the latency transparently to the evolved base station; or the evolved base station obtains, directly from the integrated reference point manager IRPManager, a latency for the cell controlled by the evolved base station to enter the energy-saving state. If the evolved base station determines that, within the latency, there is no RRC connection or active multi-mode UE in the cell controlled by the evolved base station, the evolved base station sets the cell to enter the energy-saving state.

In another embodiment provided by the present invention, the evolved base station obtains a zero-load period of a cell controlled by the evolved base station from a network management system. For example, an integrated reference point agent IRPAgent of the evolved base station receives a zero-load period sent by an integrated reference point manager IRPManager, and then the IRPAgent transfers transparently the zero-load period to the evolved base station; or the evolved base station obtains a zero-load period directly from the integrated reference point manager IRPManager. When time for the evolved base station to make a control determination is within the zero-load period of the cell, the cell is set to enter the energy-saving state.

The foregoing embodiment of the present invention provides an energy-saving control method for a cell in a heterogeneous system. Further, according to the embodiment, in a heterogeneous system, when there is no RRC connection or active multi-mode UE in the E-UTRAN cell, the E-UTRAN is set to enter the energy-saving state; or when the time for the evolved base station to make a control determination is within the zero-load period of the E-UTRAN cell, the E-UTRAN cell is set to enter the energy-saving state. Compared with the method provided by the prior art which is subject to service degradation, where, when it is detected that an E-UTRAN cell is in a light-load state, remaining active (Active) multi-mode UEs are relocated to a conventional cell (for example, a UTRAN cell), in the method according to the embodiment of the present invention, the E-UTRAN may be in an energy-saving state when it does not need to provide a high-speed data service to a hot-spot area, and the E-UTRAN cell may exit the energy-saving state when a multi-mode UE has a new high-speed data service request. Thereby high-speed data services are provided normally, which avoids a risk of user complaints caused by a conventional UTRAN cell providing a low- or medium-speed data service for a long period of time, thereby guaranteeing service experience of the multi-mode UE.

Figure 3:
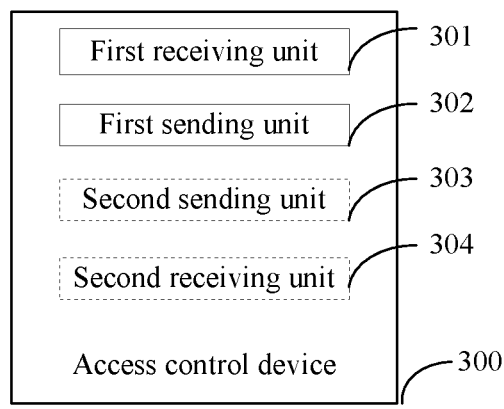
FIG. 3 is a schematic logical structural diagram of an access control device according to an embodiment of the present invention.

FIG. 3 is a schematic logical structural diagram of an access control device 300 according to an embodiment of the present invention. For ease of description, only parts related to the embodiment of the present invention are illustrated. The access control device includes a first receiving unit 301 and a first sending unit 302.

The first receiving unit 301 is configured to receive a service request of a multi-mode user equipment UE; and the first sending unit 302 is configured to send, when a radio resource of a serving cell cannot satisfy the service request of the multi-mode UE, and after it is determined that a heterogeneous-system neighboring cell of the serving cell is in an energy-saving state, an exit energy-saving state request message to an access control device of the heterogeneous-system neighboring cell, where the exit energy-saving state request message is used to request the heterogeneous-system neighboring cell to exit the energy-saving state.

As an optional embodiment, on the basis of the access control device 300 illustrated in FIG. 3, the access control device 300 further includes a second sending unit 303 configured to send instruction information to the multi-mode UE, where the instruction information is used to instruct the multi-mode UE to, after the heterogeneous-system neighboring cell exits the energy-saving state, redirect to the heterogeneous-system neighboring cell to request for a service.

As another optional embodiment, the first receiving unit 301 may further be configured to receive an RRC connection setup request sent by the multi-mode UE, and the second sending unit 303 is further configured to send an RRC connection setup reject message to the multi-mode UE, where the RRC connection setup reject message includes the instruction information.

As another optional embodiment, the first receiving unit 301 may further be configured to receive a radio access bearer assignment request sent by a core network device where the radio access bearer assignment request includes the service request of the multi-mode UE; and the second sending unit 303 is further configured to send a radio access bearer assignment response message to the core network device, where the radio access bearer assignment response message includes the instruction information.

Alternatively, in the embodiment, the access control device 300 may further include a second receiving unit 304 configured to receive an exit energy-saving state response message returned by an access control device of the heterogeneous-system neighboring cell, where the exit energy-saving state response message carries time for the heterogeneous-system neighboring cell to exit the energy-saving state.

Alternatively, in the embodiment, the RRC connection setup reject message or the radio access bearer assignment response message includes wait time for the multi-mode UE to redirect to the heterogeneous-system neighboring cell that has exited the energy-saving state, where the wait time is used to instruct the multi-mode UE to, when the wait time is due, redirect to the heterogeneous-system neighboring cell that has exited the energy-saving state, where the wait time may be greater than or equal to the time for the heterogeneous-system neighboring cell to exit the energy-saving state.

Alternatively, in the embodiment, the exit energy-saving state request message carries an identifier of the access control device of the heterogeneous-system neighboring cell in the energy-saving state, an identifier of the heterogeneous-system neighboring cell in the energy-saving state, and a type of an operation to be performed.

In a more specific embodiment, the heterogeneous-system neighboring cell includes an E-UTRAN cell neighboring the serving cell, and the first sending unit 302 determines whether a heterogeneous-system neighboring cell of the serving cell is in an energy-saving state by searching a neighboring cell list of the serving cell for the E-UTRAN cell in an energy-saving state.

The embodiment of the access control device illustrated in FIG. 3 may be used to implement the method embodiment illustrated in FIG. 1, where the embodiment illustrated in FIG. 1 may be referenced to for specific operations performed by the access control device, which will not be described repeatedly herein.

The embodiment of the present invention provides an access control device. Further, in a solution of an optional embodiment, when the serving cell is a GSM cell or a UTRAN cell, and the heterogeneous-system neighboring cell is an E-UTRAN cell, compared with the method provided by the prior art which is subject to service degradation, where, when it is detected that the E-UTRAN cell is in a light-load state, remaining active (Active) UEs are migrated to a conventional cell (a UTRAN cell), the access control device according to the embodiment of the present invention may request the E-UTRAN cell to enter an energy-saving state when it does not need to provide a high-speed data service to a hot spot area, and may request the E-UTRAN cell to exit the energy-saving state immediately when the multi-mode UE has a new high-speed data service request. Thereby high-speed data services are provided normally, which avoids a risk of user complaints caused by a conventional cell (for example, a UTRAN cell) providing a low- or medium-speed data service to the multi-mode UE for a long period of time, thereby guaranteeing service experience of the multi-mode UE.

Figure 4:
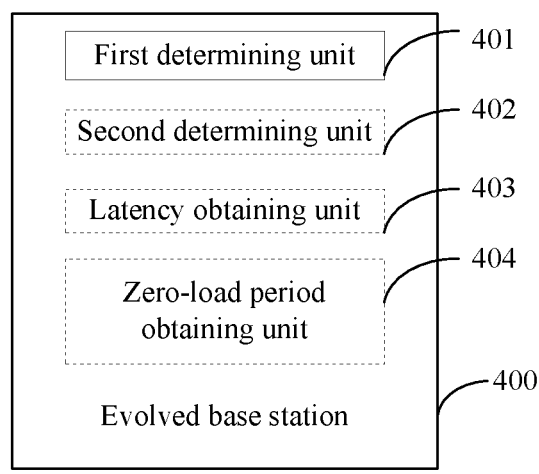
FIG. 4 is a schematic logical structural diagram of an evolved base station according to an embodiment of the present invention.

FIG. 4 is a schematic logical structural diagram of an evolved base station 400 according to an embodiment of the present invention. For ease of description, only parts related to the embodiment of the present invention are illustrated. The evolved base station (e-NodeB, evolved NodeB) illustrated in FIG. 4 may be a control base station of an E-UTRAN cell in a heterogeneous system, where the E-UTRAN cell is a cell covered by a fourth generation mobile communications technology 4G in the heterogeneous system. The evolved base station 400 illustrated in FIG. 4 is configured to determine whether to set a cell controlled by the evolved base station to enter an energy-saving state according to whether there is a radio resource control RRC connection or an active multi-mode user equipment UE in the cell or according to a zero-load period of the cell.

As shown in FIG. 4, the evolved base station 400 includes a first determining unit 401 or a second determining unit 402. The first determining unit determines whether to set a cell controlled by the evolved base station to enter an energy-saving state according to whether there is a radio resource control RRC connection or an active multi-mode user equipment UE in the cell, and the second determining unit determines whether to set the cell to enter an energy-saving state according to a zero-load period of the cell.

Specifically, the first determining unit 401 is further configured to, when determining that there is no RRC connection or active multi-mode UE in the cell, set the cell to enter the energy-saving state.

Alternatively, the evolved base station 400 further includes a latency obtaining unit 403 configured to obtain a latency set by a network management system for the cell to enter the energy-saving state; and the first determining unit 401 is further configured to, when determining that there is no RRC connection or active multi-mode UE in the cell during the latency, set the cell to enter the energy-saving state.

Alternatively, the evolved base station 400 further includes a zero-load period obtaining unit 404 configured to obtain a zero-load period of the cell from the network management system, and the second determining unit 402 is further configured to, when time for the evolved base station to make a control determination is within the zero-load period of the cell, set the cell to enter the energy-saving state.

The embodiment of the evolved base station illustrated in FIG. 4 may be used to implement the method embodiment illustrated in FIG. 2, where the embodiment illustrated in FIG. 2 may be referenced to for specific operations performed by the evolved base station, which will not be described repeatedly herein.

The embodiment of the present invention provides an evolved base station. Further, according to the embodiment, in a heterogeneous system, the evolved base station may, when there is no RRC connection or active multi-mode UE in the E-UTRAN cell, set the E-UTRAN to enter the energy-saving state; or when the time for the evolved base station to make a control determination is within the zero-load period of the E-UTRAN cell, set the E-UTRAN cell to enter the energy-saving state. Compared with the method provided by the prior art which is subject to service degradation, where, when it is detected that an E-UTRAN cell is in a light-load state, remaining active (Active) multi-mode UEs are migrated to a conventional cell (for example, a UTRAN cell), the evolved base station according to the embodiment of the present invention may set the E-UTRAN to enter an energy-saving state when it does not need to provide a high-speed data service to a hot-spot area, and may cause the E-UTRAN cell to exit the energy-saving state immediately when a multi-mode UE has a new high-speed data service request. Thereby, high-speed data services are provided normally, which avoids a risk of user complaints caused by a conventional cell (for example, a UTRAN cell) providing a low- or medium-speed data service to the multi-mode UE for a long period of time, thereby guaranteeing service experience of the multi-mode UE.

Relative to an E-UTRAN cell that emerges recently, an existing GSM cell or UTRAN cell may be referred to as a conventional cell. Similarly, with the development of communication technologies, relative to a more advanced radio access technology after E-UTRAN, an E-UTRAN cell may also be referred to as a conventional cell.

Persons of ordinary skill in the art may understand that all or a part of the steps of the various methods according to the embodiments may be implemented by a program instructing relevant hardware. The program may be stored in a computer readable storage medium, and the storage medium may include a read-only memory (ROM, Read Only Memory), a random access memory (RAM, Random Access Memory), a magnetic disk, or a CD-ROM, and so on. Alternatively, the units of the access control device illustrated in FIG. 3 may be integrated in a processor of the access control device, and the units of the evolved base station illustrated in FIG. 4 may be integrated in a processor of the evolved base station.

An energy-saving control method for a cell in a heterogeneous system, an access control device, and an evolved base station provided by the embodiments of the present invention have been described in detail. The principle and embodiments of the present invention are described by using specific examples herein. The above embodiments are described to help understand the method of the present invention. Persons of ordinary skill in the art can make variations to the specific embodiments and application scope without departing from the idea of the present invention. Therefore, the specification herein shall not be construed as to limit the present invention.

What is claimed is:

1. An energy-saving control method for a cell in a heterogeneous system, comprising:
    receiving, by an access control device of a serving cell, a service request of a multi mode user equipment (UE); and
    when a radio resource of the serving cell cannot satisfy the service request of the multi mode UE, and if the access control device of the serving cell determines that a heterogeneous system neighboring cell of the serving cell is in an energy-saving state, sending, by the access control device of the serving cell, an exit energy-saving state request message to an access control device of the heterogeneous-system neighboring cell, wherein the exit energy-saving state request message is used to request the heterogeneous-system neighboring cell to exit the energy-saving state;

sending, by the access control device of the serving cell, instruction information to the multi-mode UE, wherein the instruction information is one of an RRC connection setup reject message and a radio access bearer assignment response message, and includes a wait time for the multi-mode UE to redirect to the heterogeneous-system neighboring cell after exiting the energy-saving state, the wait time being greater than or equal to time for the heterogeneous-system neighboring cell to exit the energy-saving state, and the wait time is used to instruct the multi-mode UE to, when the wait time is due, redirect to the heterogeneous system neighboring cell to request for a service.

2. The method according to claim 1, wherein the exit energy-saving state request message carries an identifier of the access control device of the heterogeneous-system neighboring cell in the energy-saving state, an identifier of the heterogeneous-system neighboring cell in the energy-saving state, and a type of an operation to be performed.

3. The method according to claim 1, further comprising:
receiving, by the access control device of the serving cell, an exit energy-saving state response message returned by the access control device of the heterogeneous-system neighboring cell, wherein the exit energy-saving state response message carries time for the heterogeneous-system neighboring cell to exit the energy-saving state.

4. The method according to claim 1, wherein:
the receiving, by an access control device of a serving cell, a service request of a multi-mode user equipment UE comprises: receiving, by the access control device of the serving cell, a radio resource control (RRC) connection setup request sent by the multi-mode UE; and the instruction information is comprised in an RRC connection setup reject message sent by the access control device of the serving cell to the multi-mode UE; or
the receiving, by an access control device of a serving cell, a service request of a multi-mode UE comprises: receiving, by the access control device of the serving cell, a radio access bearer assignment request sent by a core network device, wherein the radio access bearer assignment request comprises the service request of the multi-mode UE; and the instruction information is comprised in a radio access bearer assignment response message sent by the access control device of the serving cell to the core network device.

5. An access control device, wherein the access control device comprises:
a receiver, configured to receive a service request of a multi-mode user equipment (UE); and
a transmitter, configured to send, when a radio resource of a serving cell cannot satisfy the service request of the multi-mode UE, and after it is determined that a heterogeneous system neighboring cell of the serving cell is in an energy-saving state, an exit energy-saving state request message to an access control device of the heterogeneous-system neighboring cell, wherein the exit energy-saving state request message is used to request the heterogeneous-system neighboring cell to exit the energy-saving state;
the transmitter, configured to send instruction information to the multi-mode UE, wherein the instruction information is one of an RRC connection setup reject message and a radio access bearer assignment response message, and includes a wait time for the multi-mode UE to redirect to the heterogeneous-system neighboring cell after exiting the energy-saving state, the wait time being greater than or equal to time for the heterogeneous system neighboring cell to exit the energy-saving state, and the wait time is used to instruct the multi-mode UE to, when the wait time is due, redirect to the heterogeneous-system neighboring cell to request for a service.

6. The access control device according to claim 5, wherein the exit energy-saving state request message carries an identifier of the access control device of the heterogeneous-system neighboring cell in the energy-saving state, an identifier of the heterogeneous-system neighboring cell in the energy-saving state, and a type of an operation to be performed.

7. The access control device according to claim 5, wherein:
the receiver, further configured to receive an exit energy-saving state response message returned by the access control device of the heterogeneous-system neighboring cell, wherein the exit energy-saving state response message carries time for the heterogeneous-system neighboring cell to exit the energy-saving state.

8. The access control device according to claim 5, wherein:
the receiver is configured to receive an RRC connection setup request sent by the multi-mode UE; and the transmitter is further configured to send an RRC connection setup reject message to the multi-mode UE, wherein the RRC connection setup reject message comprises the instruction information; or
the receiver is configured to receive a radio access bearer assignment request sent by a core network device, wherein the radio access bearer assignment request comprises the service request of the multi-mode UE; and the transmitter is further configured to send a radio access bearer assignment response message to the core network device, wherein the radio access bearer assignment response message comprises the instruction information.

* * * * *